(12) United States Patent
Umegaki et al.

(10) Patent No.: US 10,466,039 B2
(45) Date of Patent: Nov. 5, 2019

(54) SURFACE SHAPE MEASURING METHOD AND SURFACE SHAPE MEASURING DEVICE

(71) Applicant: JFE Steel Corporation, Tokyo (JP)

(72) Inventors: Yoshiyuki Umegaki, Tokyo (JP); Manabu Harazono, Tokyo (JP)

(73) Assignee: JFE Steel Corporation, Tokyo (JP)

( * ) Notice: Subject to any disclaimer, the term of this patent is extended or adjusted under 35 U.S.C. 154(b) by 1298 days.

(21) Appl. No.: 14/397,495

(22) PCT Filed: May 22, 2013

(86) PCT No.: PCT/JP2013/064150
§ 371 (c)(1),
(2) Date: Oct. 28, 2014

(87) PCT Pub. No.: WO2013/179957
PCT Pub. Date: Dec. 5, 2013

(65) Prior Publication Data
US 2015/0106056 A1    Apr. 16, 2015

(30) Foreign Application Priority Data
May 29, 2012   (JP) .................................. 2012-121783

(51) Int. Cl.
*G01B 11/24* (2006.01)
*G01B 11/22* (2006.01)
(Continued)

(52) U.S. Cl.
CPC .......... *G01B 11/24* (2013.01); *G01B 11/0608* (2013.01); *G01B 11/22* (2013.01)

(58) Field of Classification Search
CPC ..... G01B 11/22; G01B 11/24; G01B 11/2411; G01B 11/0608
See application file for complete search history.

(56) References Cited

U.S. PATENT DOCUMENTS

2010/0157763 A1* 6/2010 Verbeek ................. G11B 19/12
                                                                  369/53.22

FOREIGN PATENT DOCUMENTS

| JP | 07-286827 A | 10/1995 |
| JP | 10-089939 A | 4/1998 |
| JP | 2011-099729 A | 5/2011 |

OTHER PUBLICATIONS

Notice of Grounds for Rejection dated Oct. 15, 2015 of corresponding Korean Application No. 2014-7028355 along with an English translation.

* cited by examiner

*Primary Examiner* — Michael J Dalbo
(74) *Attorney, Agent, or Firm* — DLA Piper LLP (US)

(57) ABSTRACT

A surface shape measuring method includes: acquiring displacement data on an object surface facing an optical displacement meter by scanning the object surface with the optical displacement meter that applies a light beam on the object surface and performs measurement; detecting an approximate range on the object surface including a groove formed on the object surface by searching the displacement data; calculating a groove start point and a groove terminating point of the groove included in the approximate range; calculating a smallest value of the displacement data in a restricted range from a center position between the groove start point and the groove terminating point to a width defined at a predetermined ratio with respect to the groove width; and calculating a difference between the smallest value of the calculated displacement data and the height of the object surface as the depth of the groove formed on the object surface.

12 Claims, 9 Drawing Sheets

(51) Int. Cl.
*G11B 11/06* (2006.01)
*G01B 11/06* (2006.01)

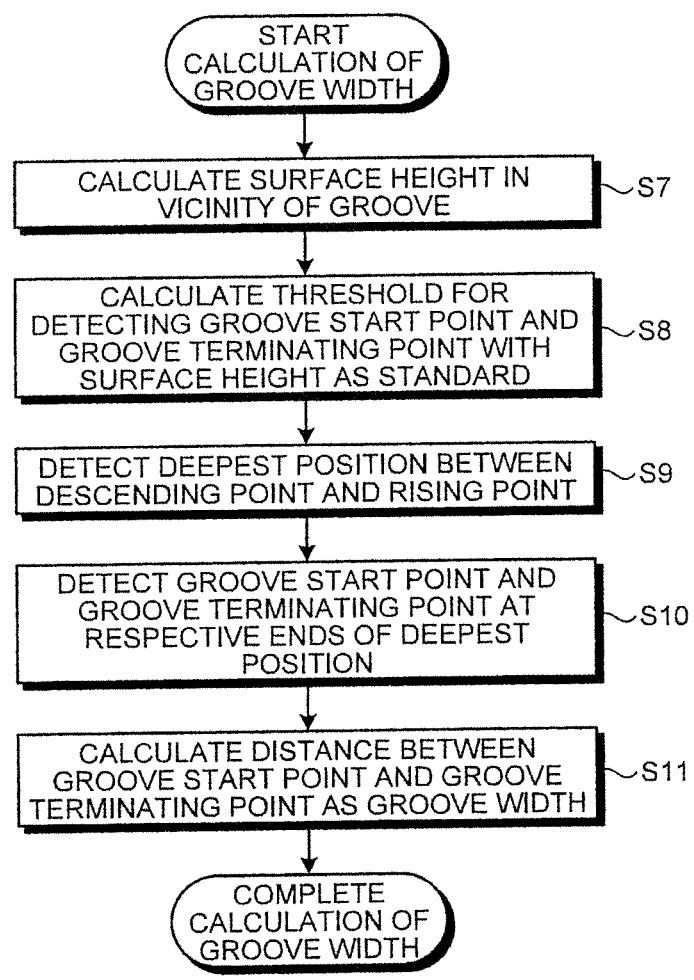

SURFACE SHAPE MEASURING METHOD AND SURFACE SHAPE MEASURING DEVICE

TECHNICAL FIELD

This disclosure relates to a surface shape measuring method and a surface shape measuring device that measures the size of a groove formed on a surface of an object.

BACKGROUND

Various techniques have been known that form a concavo-convex pattern on a surface of an object and improve the function of the object with the concavo-convex pattern. As an example, with electrical steel sheet, a technique is known that forms fine grooves on the surface of electrical steel sheet and reduces the iron loss of the sheet. When processing the surface of an object to improve its function, the shape of a concavo-convex pattern formed on the surface directly affects the quality of the object. Accurate measurement of the shape of the concavo-convex pattern formed on the surface of an object is thus quite important in managing the manufacturing process and assuring product quality.

For example, Japanese Patent Application Laid-open No. 10-89939 describes a surface shape measuring method that successively measures concavo-convex shapes formed on the surface of an object on the production line. That surface shape measuring method measures the amount of displacement between a displacement meter and the object using the displacement meter arranged to relatively move with respect to the object and obtains the cross-sectional shape of the object. The depth (or the height) and the width of the concavo-convex shape are each calculated based on the obtained sectional shape.

As another surface shape measuring method using an optical displacement meter (a laser displacement meter), Japanese Patent Application Laid-open No. 2011-99729 describes a technique that measures the depth and the width of a groove based on a signal of reflection intensity together with a signal of displacement. With the technique described in JP '729, the depth and the width of a groove are measured by excluding an abnormal value of the displacement signal detected at a slant portion of the groove based on the signal of reflection intensity.

However, because the surface shape measuring method described in JP '729 requires a signal of reflection intensity in addition to a signal of displacement as information to be obtained from an optical displacement meter, the method is inapplicable for an optical displacement meter that receives no outputs from a signal of reflection intensity or an optical displacement meter with a function to obtain sufficient reflection intensity by adjusting the intensity of irradiation light and photodetector gain.

Furthermore, when measuring the shape of a fine groove with a triangulation optical displacement meter, the measured value is problematically unstable at a slant portion of the groove due to a shortage of a received light amount. With a displacement meter that adjusts irradiation light and photodetector gain, a shortage of a received light amount less occurs. Instead, such a phenomenon occurs that the shape at a slant portion of the groove is misrecognized, because that kind of displacement meter receives secondary reflection light caused by the reflection of the light applied to the slant portion of the groove in multiple directions inside the groove. Due to such misrecognition, abnormal displacement, in which the groove is recognized deeper than its actual depth, is frequently observed. The surface shape measuring method described in JP '939 thus has a direct problem that the depth of a groove is incorrectly measured.

Furthermore, use of an optical displacement meter to measure the surface of steel sheet may cause comparatively large noise for the size of a groove formed on the surface. The surface shape measuring method described in JP '939 thus has another problem that the position of the groove is incorrectly detected due to the noise caused in the convex direction opposite to the shape of the groove (concave shape).

It could therefore be helpful to provide a surface shape measuring method and a surface shape measuring device that can eliminate disturbance in displacement data and accurately measure the size of a groove formed on a surface of an object using only the displacement data on the surface of the object measured by using a displacement meter.

SUMMARY

We thus provide a surface shape measuring method including a displacement data acquiring step of acquiring displacement data on an object surface facing an optical displacement meter by scanning the object surface with the optical displacement meter that applies a light beam on the object surface and performs measurement; a groove approximate range detecting step of detecting an approximate range on the object surface including a groove formed on the object surface by searching the displacement data; a groove width calculating step of calculating a groove start point and a groove terminating point of the groove included in the approximate range; a deepest position detecting step of calculating a smallest value of the displacement data in a restricted range from a center position between the groove start point and the groove terminating point to a width defined at a predetermined ratio with respect to the groove width; and a groove depth calculating step of calculating a difference between the smallest value of the displacement data calculated at the deepest position detecting step and the height of the object surface as the depth of the groove formed on the object surface.

We also provide a surface shape measuring device including a displacement data acquiring unit that acquires displacement data on an object surface facing an optical displacement meter by scanning the object surface with the optical displacement meter that applies a light beam on the object surface and performs measurement; a groove approximate range detecting unit that detects an approximate range on the object surface including a groove formed on the object surface by searching the displacement data; a groove width calculating unit that calculates a groove start point and a groove terminating point of the groove included in the approximate range; a deepest position detecting unit that calculates a smallest value of the displacement data in a restricted range from a center position between the groove start point and the groove terminating point to a width defined at a predetermined ratio with respect to the groove width; and a groove depth calculating unit that calculates a difference between the smallest value of the displacement data calculated by the deepest position detecting unit and the height of the object surface as the depth of the groove formed on the object surface.

The surface shape measuring method and the surface shape measuring device exert the effect that eliminates disturbance in displacement data and accurately measures the size of a groove formed on a surface of an object using only the displacement data on the surface of the object measured by using a displacement meter.

BRIEF DESCRIPTION OF THE DRAWINGS

FIG. 8 is a flowchart illustrating a method of calculating the groove width in the surface shape measuring method according to an example.

Figure 1:
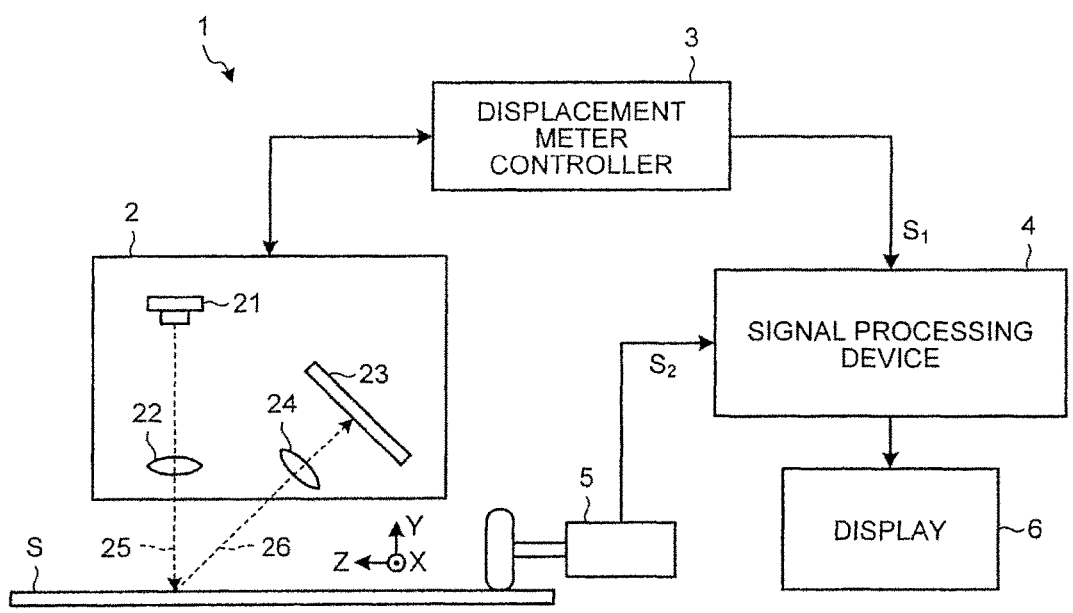
FIG. 1 is a schematic diagram illustrating an example of the configuration of a surface shape measuring device according to an example.

REFERENCE SIGNS LIST 1 surface shape measuring device
2 displacement meter head
3 displacement meter controller
4 signal processing device
5 rotary encoder
6 display
11 groove
21 laser light source
22 condenser lens
23 optical position sensor
24 imaging lens
25 laser light
26 reflection light
41 displacement data acquiring unit
42 first filtering unit
43 groove approximate range detecting unit
44 groove approximate range extracting unit
45 second filtering unit
46 groove width calculating unit
47 groove depth calculating unit

DETAILED DESCRIPTION

Our surface shape measuring method and a surface shape measuring device will be described in detail with reference to the drawings. It should be noted that the examples in the following description are not intended to limit the scope of this disclosure. Surface shape measuring device FIG. 1 is a schematic diagram illustrating an example of the configuration of a surface shape measuring device 1. The surface shape measuring device 1 measures the shape of a groove formed on the surface of steel sheet S conveyed on the production line. As FIG. 1 illustrates, the surface shape measuring device 1 includes a displacement meter head 2, a displacement meter controller 3, a signal processing device 4, a rotary encoder 5, and a display 6.

The displacement meter head 2 is a triangulation displacement meter that includes therein a laser light source 21, a condenser lens 22, an optical position sensor 23, and an imaging lens 24. Laser light 25 emitted from the laser light source 21 is applied to the surface of the steel sheet S as spot light or line light through the condenser lens 22. Reflection light 26 from the steel sheet S forms an image on a light receiving surface of the optical position sensor 23 through the imaging lens 24.

As FIG. 1 illustrates, the displacement meter head 2 vertically applies the laser light 25 emitted from the laser light source 21 onto the steel sheet S and detects the reflection light 26 at a predetermined angle with the optical position sensor 23. With this configuration, a light receiving position for the reflection light 26, which forms an image on the optical position sensor 23, varies according to a change of the distance between the surface of the steel sheet S and the displacement meter head 2. In other words, the surface shape measuring device 1 illustrated in FIG. 1 is configured to measure the distance between the surface of the steel sheet S and the displacement meter head 2 by reading out the light receiving position for the reflection light 26 on the optical position sensor 23.

The displacement meter controller 3 calculates the distance between the surface of the steel sheet S and the displacement meter head 2 by reading out an output signal to the optical position sensor 23 while supplying a power source to the displacement meter head 2 and outputting a control signal to the components inside the head. The displacement meter controller 3 thereafter outputs the distance between the surface of the steel sheet S and the displacement meter head 2 as a displacement signal $S_1$ to the signal processing device 4.

Examples of the optical position sensor 23 include a photodetector such as a position sensitive detector (PSD), a charge-coupled device (CCD), and a complementary metal oxide semiconductor (CMOS). When using a PSD for the optical position sensor 23, two currents $I_1$ and $I_2$ are output from both ends of the photodetector that has received the reflection light 26. Using the two currents $I_1$ and $I_2$, the displacement meter controller 3 calculates $(I_1-I_2)/(I_1+I_2)$ and based on the result, calculates the barycentric position that has received the reflection light 26. When using a CCD or a CMOS, each of which photodetector consists of small photodiode arrays, as the optical position sensor 23, the distribution of the received light intensity on the photodetector is obtained. In this case, the displacement meter controller 3 calculates the distance between the surface of the steel sheet S and the displacement meter head 2 based on, for example, the barycentric position or the peak position on the distribution of the received light intensity.

The signal processing device 4 restores displacement data of the steel sheet S for the entire steel sheet S with a displacement signal $S_1$ output from the displacement meter controller 3 and a pulse signal $S_2$ output from the rotary encoder 5 provided to a roller to convey the steel sheet S and based on the displacement data, calculates the shape of a groove formed on the surface of the steel sheet S. The displacement data of the steel sheet S denotes data relating to the displacement amount in the vertical direction on the surface of the steel sheet S. In other words, the displacement data of the steel sheet S is worked out by calculating the difference between the distance from the surface of the steel sheet S to the displacement meter head 2 and a specific distance serving as a standard.

The surface shape measuring device 1 illustrated in FIG. 1 includes only a single displacement meter head 2 because of the limitations of space. However, the signal processing device 4 can restore the displacement data on the entire steel sheet S by aligning a plurality of displacement meter heads 2 in the width direction (the Z direction in the drawing) of the steel sheet S. In another way, the signal processing device 4 can restore the displacement data on the entire steel sheet S by configuring the single displacement meter head 2 such that the single displacement meter head 2 can scan in the width direction (the Z direction in the drawing) of the steel sheet S.

The display 6 displays the shape (particularly, the width and the depth) of a groove formed on the surface of the steel sheet S, the shape being calculated by the signal processing device 4. Examples of the display 6 include a cathode ray tube (CRT) screen display, and the display 6 is used when an operator determines whether the shape of the groove formed on the surface of the steel sheet S is consistent with the requirement.

The way of reflection of the laser light 25 applied to a groove 11 formed on the steel sheet S will be described with reference to FIG. 2.

Figure 2A:
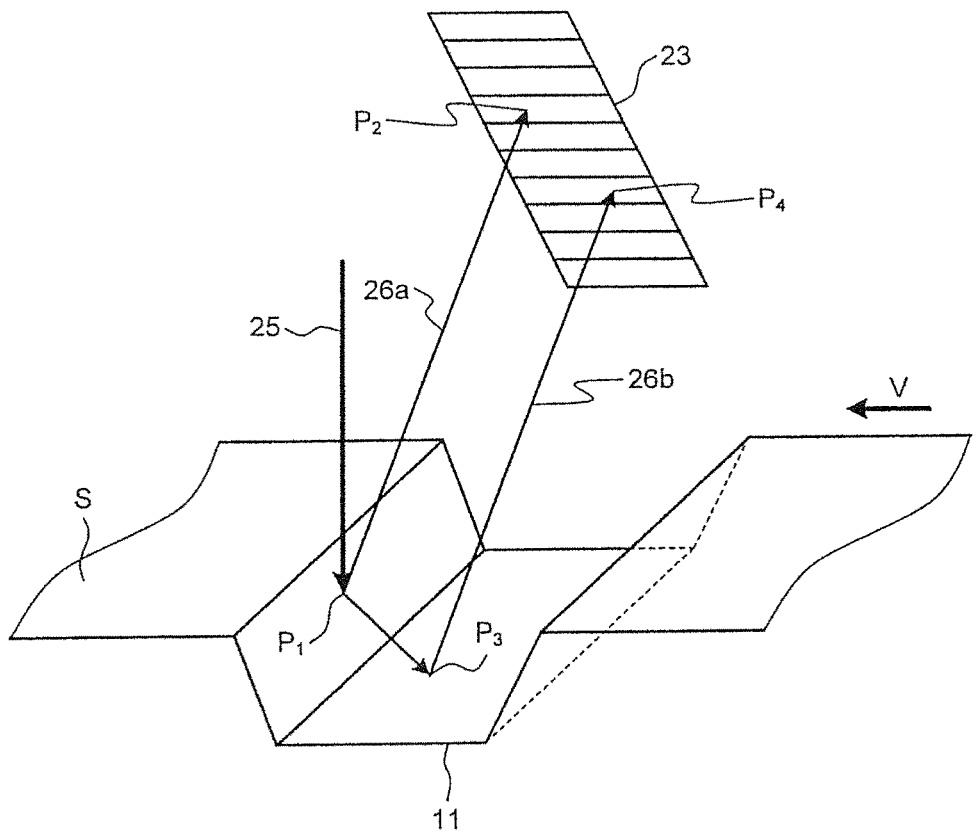
FIG. 2A is a schematic diagram depicting the way of reflection of laser light applied to a slant portion of a groove formed on steel sheet.
Figure 2B:
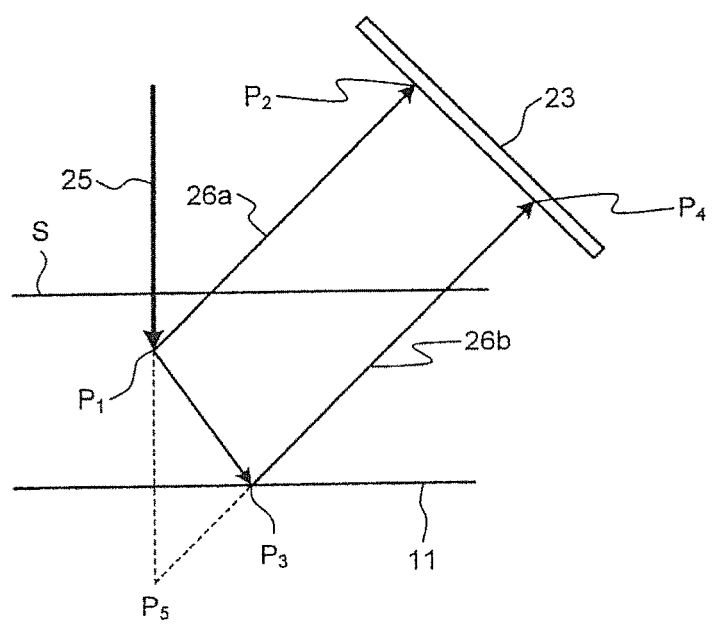
FIG. 2B is another schematic diagram depicting the way of reflection of laser light applied to the slant portion of the groove formed on the steel sheet.

FIGS. 2A and 2B are schematic diagrams illustrating the way of reflection of the laser light 25 applied to a slant portion of the groove formed on the steel sheet S. FIG. 2A is a schematic diagram depicting the trajectory of the reflection light 26 resulting from multiple reflection of the laser light 25 applied to the slant portion of the groove formed on the steel sheet S. FIG. 2B is a diagram viewed from the direction of the arrow V in FIG. 2A and schematically illustrates the mechanism in which the optical position sensor 23 misrecognizes the depth of the groove due to the reflection light 26 resulting from the multiple reflection.

As FIG. 2A illustrates, the laser light 25 applied to the slant portion of the groove formed on the steel sheet S generates reflection light 26a, which is reflected only on the slant portion (the position $P_1$ in the drawing) of the groove 11 and enters the optical position sensor 23, and reflection light 26b, which is reflected on the slant portion (the position $P_1$ in the drawing) of the groove 11 and once again reflected on the bottom (the position $P_3$ in the drawing) thereof and enters the optical position sensor 23. As FIG. 2A illustrates, the optical position sensor 23 has different light receiving positions, one of which is a light receiving position (the position $P_2$ in the drawing) for the reflection light 26a reflected on the slant portion (the position $P_1$ in the drawing) and the other of which is a light receiving position (the position $P_4$ in the drawing) for the reflection light 26b reflected on the bottom (the position $P_3$ in the drawing).

As FIG. 2B illustrates, conventional surface shape measuring devices may hence misrecognize the depth of the groove 11 formed on the steel sheet S. As FIG. 2B illustrates, with the triangulation method, the position of the height (or the depth) of the steel sheet S is recognized as the position $P_1$ in the drawing when the light receiving position on the optical position sensor 23 is the position $P_2$ in the drawing, and the position of the height (or the depth) of the steel sheet S is recognized as the position $P_5$ in the drawing when the light receiving position on the optical position sensor 23 is the position $P_4$ in the drawing. With the triangulation method, the position of the height (or the depth) of the steel sheet S is thus misrecognized as the position $P_5$ in the drawing due to occurrence of multiple reflection, even though the actual position of the height (or the depth) of the steel sheet S is the position $P_1$ in the drawing.

In view of the above-described disadvantages, our surface shape measuring method and the surface shape measuring device eliminate such misrecognition resulting from multiple reflection with an effective signal processing method in the signal processing device 4.

Signal Processing Device

Figure 3:
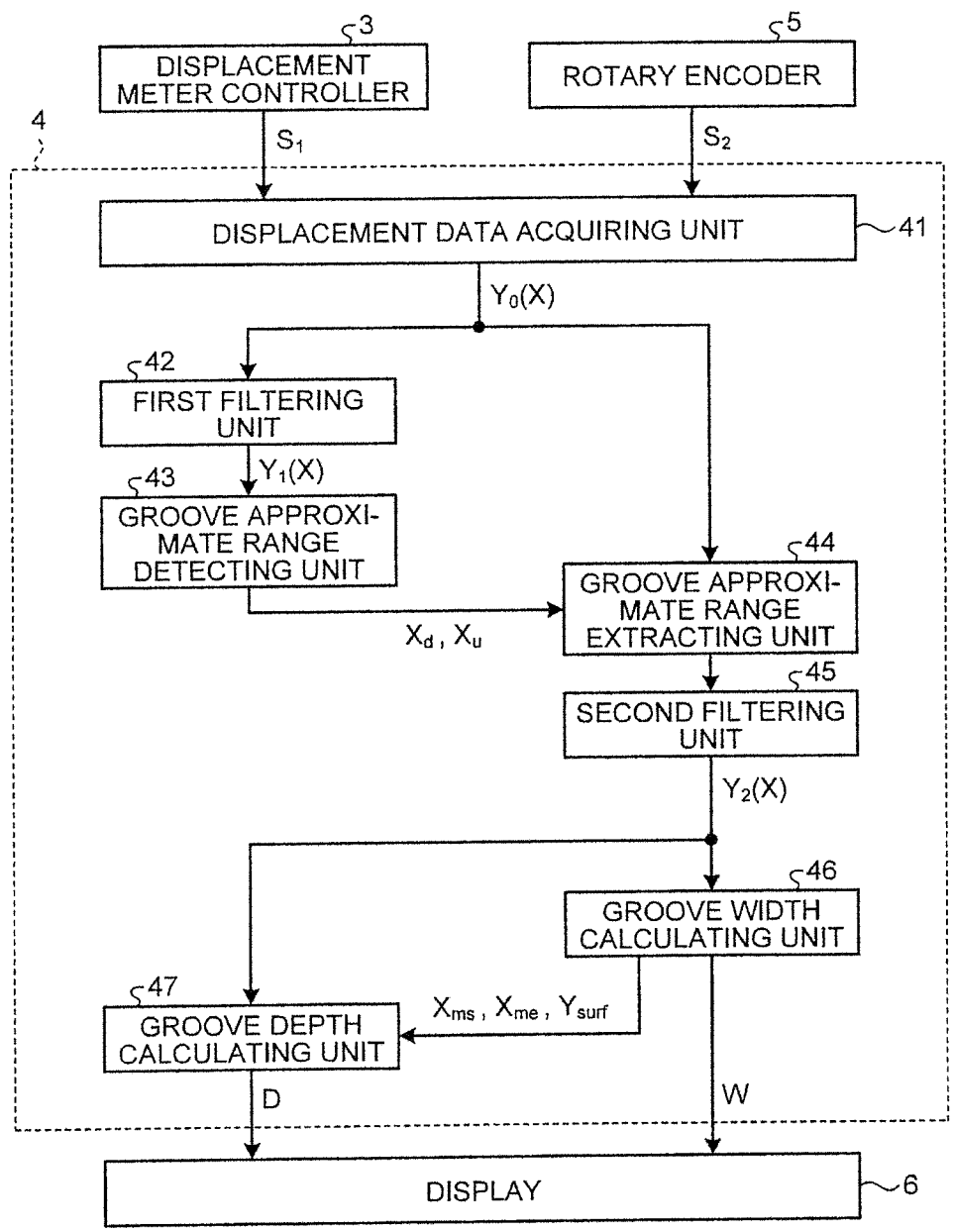
FIG. 3 is a functional block diagram illustrating internal processing of a signal processing device according to an example.

FIG. 3 is a functional block diagram illustrating internal processing of the signal processing device 4. As FIG. 3 illustrates, the signal processing device 4 includes a displacement data acquiring unit 41, a first filtering unit 42, a groove approximate range detecting unit 43, a groove approximate range extracting unit 44, a second filtering unit 45, a groove width calculating unit 46, and a groove depth calculating unit 47.

The displacement data acquiring unit 41 performs an analog-to-digital conversion and the like after receiving the displacement signal $S_1$ from the displacement meter controller 3 and at the same time analyzes the running speed and the running position of the steel sheet S after receiving, from the rotary encoder 5, the pulse signal $S_2$ generated on every conveyance of the steel sheet S at a predetermined distance. With this, the displacement data acquiring unit 41 restores displacement data $Y_0$ (X) on the steel sheet S with the displacement signal $S_1$ sent from the displacement meter controller 3. In this process, X indicates a position coordinate in the conveyance direction of the steel sheet S, and Y indicates a position coordinate in the height direction of the steel sheet S (see FIG. 1). Although the steel sheet S has another position coordinate Z in the width direction, the position coordinate Z in the width direction is fixed at a point in the following description.

A sampling interval $\Delta X$ on the displacement data $Y_0$ (X) is defined by a predetermined time interval of the analog-to-digital conversion and a time interval of the pulse signal $S_2$ generated by the rotary encoder 5. The time interval of the pulse signal $S_2$ generated by the rotary encoder 5 indicates the distance where the steel sheet S is conveyed during the time interval, and the time interval of the analog-to-digital conversion indicates the interval during which a sample point on the displacement data $Y_0$ (X) is generated. Accordingly, the frequency of the pulse signal $S_2$ included in the time interval of the analog-to-digital conversion defines the sampling interval $\Delta X$ on the steel sheet S. If the time interval of the pulse signal $S_2$ sent from the rotary encoder 5 is sufficiently short, the displacement data acquiring unit 41 can perform the analog-to-digital conversion synchronously with the pulse signal $S_2$, thereby defining the sampling interval $\Delta X$ on the steel sheet S.

The first filtering unit 42 performs filtering as necessary on the displacement data $Y_0$ (X) acquired by the displacement data acquiring unit 41 and generates post-first-filtering displacement data $Y_1$ (X). The displacement data $Y_0$ (X) includes a measuring noise resulting from the roughness of the surface of the steel sheet S, and a linear low-pass filter such as a moving average filter or a median filter is thus used for the filtering to eliminate such a noise. A plurality of filters may be combined.

The displacement data $Y_0$ (X) acquired by the displacement data acquiring unit 41 sometimes includes a comparatively long-period vibrational component compared with the cross-sectional shape of the groove. This comparatively long-period vibrational component is caused by the fluctuation of the path line of the steel sheet S or the mechanical vibration in the measuring system. To eliminate the comparatively long-period vibrational component, a high-pass filter may further be combined for the first filtering unit 42. The filter order (the size of a range for calculating an average value in a moving average filter or the size of a range for calculating a median in a median filter) is determined such that the range of influence on the steel sheet S is constant (which means that the filter order is in inverse proportion to the sampling interval $\Delta X$.) By determining the filter order, the filter can exert the same effect even if a sampling interval $\Delta X$ is different.

The groove approximate range detecting unit 43 detects an approximate range of the groove based on the displacement data $Y_1$ (X) on which the first filtering unit 42 has performed filtering. The approximate range of the groove is defined as a zone from the position where a groove starts descending to form a concave shape (a descending point $X_d$) to the position where the groove completes rising to form the concave shape (a rising point $X_u$). The zone includes a cross-sectional shape of a single groove. The method of detecting the groove approximate range is implemented with the groove approximate range detecting unit 43 analyzing the amount of a local change on the displacement $Y_1$ (X) on which the first filtering unit 42 has performed filtering. The method of analyzing the amount of a local change on the displacement $Y_1$ (X) will be later described with reference to FIG. 6 and FIGS. 7A to 7C.

Figure 4:
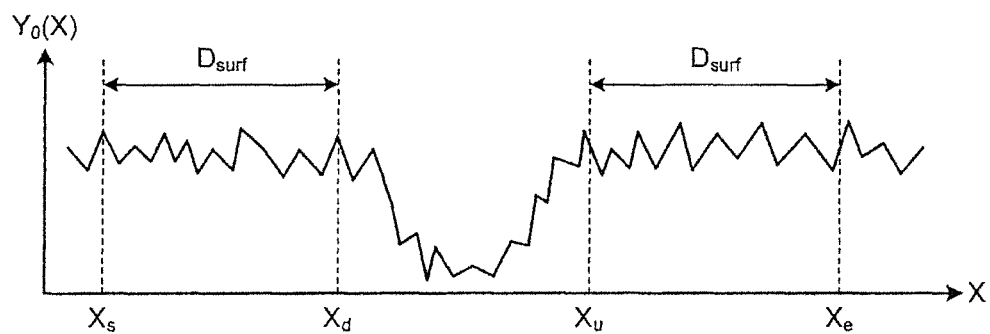
FIG. 4 is a graph illustrating displacement data in a groove approximate range extracted by a groove approximate range extracting unit.

After the detection of the groove approximate range (the range from the descending point $X_d$ to the rising point $X_u$) by the groove approximate range detecting unit 43, the groove approximate range extracting unit 44 extracts a predetermined range including the groove approximate range from the displacement data $Y_0$ (X). Specifically, when defining a start point of the groove approximate range as an approximate start point $X_s$ and a terminating point of the groove approximate range as an approximate terminating point $X_e$, the groove approximate range extracting unit 44 extracts the range from: $X_s = X_d - D_{surf}$ to: $X_e = X_u + D_{surf}$. In this case, $D_{surf}$ (>0) is a predetermined value. FIG. 4 is a graph indicating the displacement data $Y_0$ (X) at a position X in the groove approximate range extracted by the groove approximate range extracting unit 44. As FIG. 4 indicates, the range from the approximate start point $X_s$ to the descending point $X_d$ and the range from the rising point $X_u$ to the approximate terminating point $X_e$ on the displacement data $Y_0$ (X) indicate the actual surface height of the steel sheet S in the front and the back of the groove (from the descending point $X_d$ to the rising point $X_u$).

The second filtering unit 45 performs second filtering, as necessary, on the displacement data $Y_0$ (X) from which the groove approximate range has been extracted by the groove approximate range extracting unit 44, whereby post-second-filtering displacement data $Y_2$ (X) is generated.

The filter applied on the displacement data $Y_0$ (X) from which the groove approximate range has been extracted by the groove approximate range extracting unit 44 is intended to eliminate a noise to calculate the groove width and the groove depth detected in the subsequent processing. A median filter, with which the shape at an edge of the groove is easily retained (the shape less dulls), is thus most suitable for the second filtering unit 45. Depending on the characteristics of the laser displacement meter, a linear low-pass filter such as a moving average filter or the like is also suitable for the second filtering unit 45.

The displacement data $Y_2$ (X) from which a noise has been eliminated by the second filtering unit 45 is transmitted to the groove width calculating unit 46 which calculates the groove width included in the approximate range of the groove. The method of calculating the groove width by using the groove width calculating unit 46 will be later described with reference to FIG. 8 and FIG. 9.

The displacement data $Y_2$ (X) from which a noise has been eliminated by the second filtering unit 45 is further transmitted to the groove depth calculating unit 47, which calculates the groove depth included in the approximate range of the groove. In this process, the groove depth calculating unit 47 requires information of the start point $X_{ms}$ and the terminating point $X_{me}$ of the groove included in the approximate range to calculate the groove depth included in the approximate range of the groove. The groove depth calculating unit 47 thus acquires information of the start point $X_{ms}$ and the terminating point $X_{me}$ of the groove calculated by the groove width calculating unit 46.

The groove depth calculating unit 47 further requires the surface height $Y_{surf}$ of the steel sheet S to calculate the groove depth included in the approximate range of the groove. The groove depth calculating unit 47 can acquire the information of the surface height $Y_{surf}$ of the steel sheet S calculated by the groove width calculating unit 46 or can calculate the surface height $Y_{surf}$ by itself based on the displacement data $Y_2$ (X). Furthermore, the groove depth calculating unit 47 can exert the same function by acquiring information of the start point $X_d$ and the terminating point $X_u$ of the groove approximate range detected by the groove approximate range detecting unit 43 instead of acquiring information of the start point $X_{ms}$ and the terminating point $X_{me}$ of the groove calculated by the groove width calculating unit 46. The method of calculating the groove depth by using the groove depth calculating unit 47 will be later described with reference to FIGS. 10 through 11B.

After a groove width W and a groove depth D of the groove on the steel sheet S are calculated by the groove width calculating unit 46 and the groove depth calculating unit 47, the display 6 displays the groove width W and the groove depth D.

Surface Shape Measuring Method

A surface shape measuring method will be described with reference to FIGS. 5 through 11B.

Figure 5:
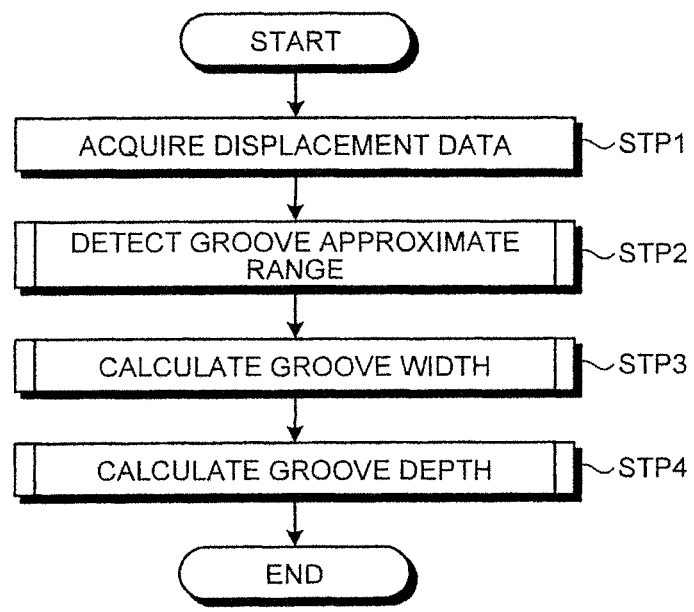
FIG. 5 is a flowchart illustrating the general flow of a surface shape measuring method according to an example.

FIG. 5 is a flowchart illustrating the general flow of the surface shape measuring method. As FIG. 5 illustrates, the surface shape measuring method generally includes a displacement data acquiring step (Step STP1), a groove approximate range detecting step (Step STP2), a groove width calculating step (Step STP3), and a groove depth calculating step (Step STP4). The displacement data acquiring step (Step STP1) is ordinary processing as a preliminary stage of the surface shape measuring method, and the surface shape measuring method will be thus described with the groove approximate range detecting step (Step STP2), the groove width calculating step (Step STP3), and the groove depth calculating step (Step STP4).

Figure 6:
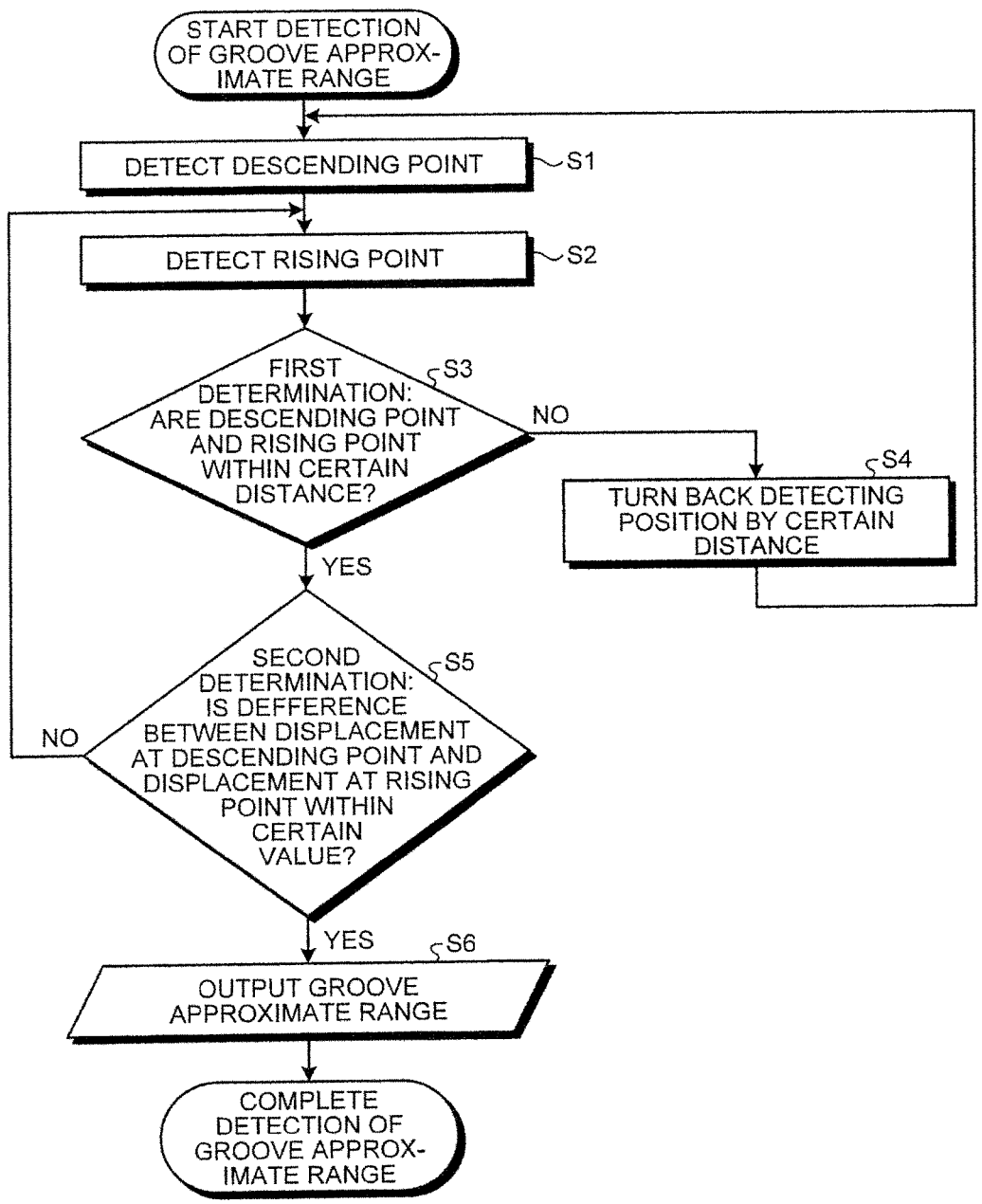
FIG. 6 is a flowchart illustrating a method of detecting the groove approximate range in the surface shape measuring method according to an example.
Figure 7A:
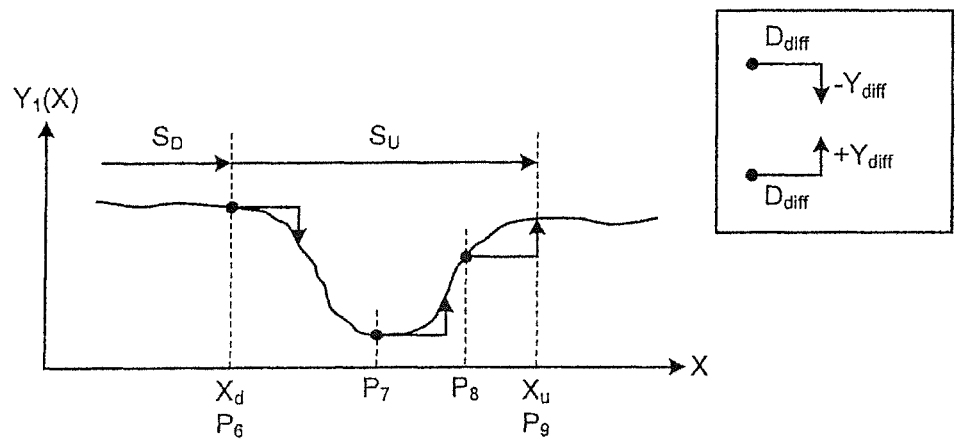
FIG. 7A is a conceptual diagram illustrating the way in which the groove approximate range is detected in the surface shape measuring method according to an example.
Figure 7B:
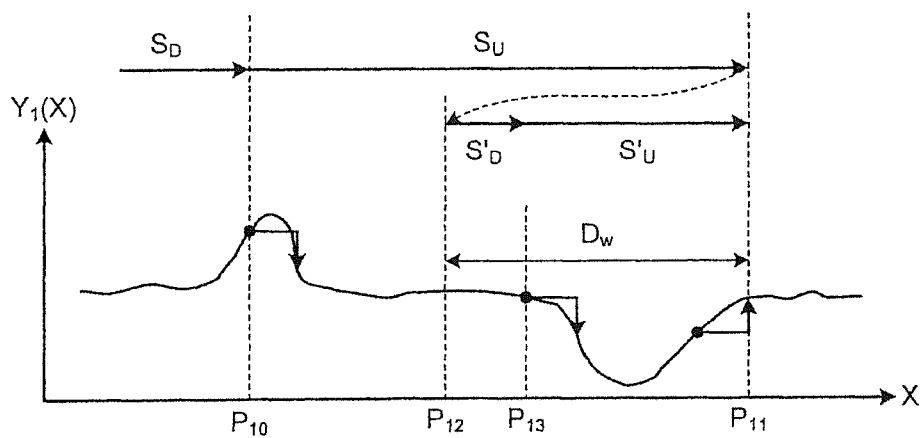
FIG. 7B is another conceptual diagram illustrating the way in which the groove approximate range is detected in the surface shape measuring method according to an example.
Figure 7C:
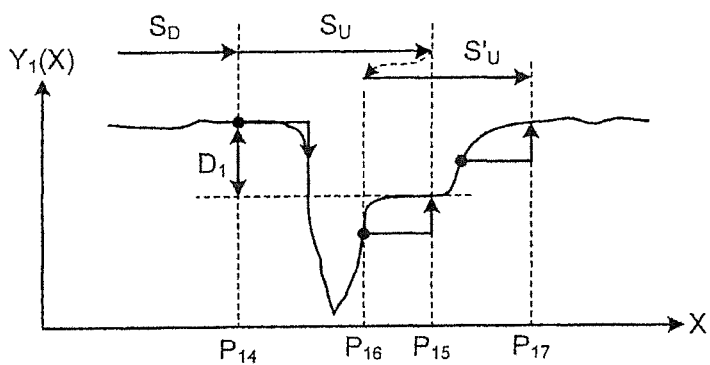
FIG. 7C is still another conceptual diagram illustrating the way in which the groove approximate range is detected in the surface shape measuring method according to an example.
Figure 9:
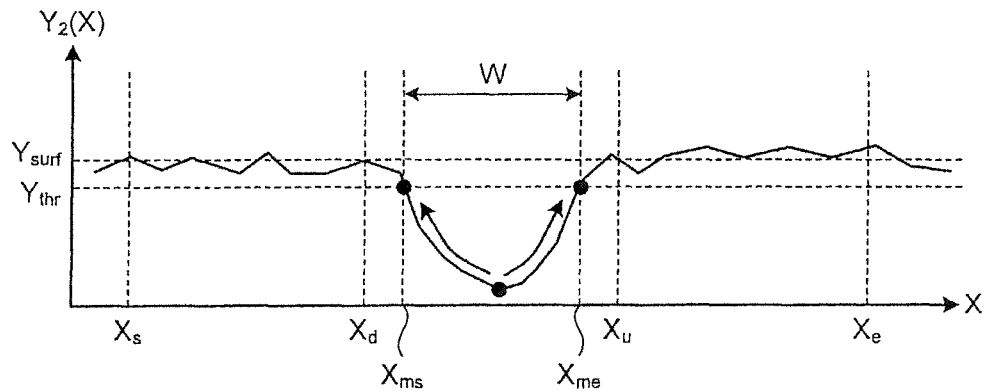
FIG. 9 is a conceptual diagram illustrating the way in which the groove width is calculated in the surface shape measuring method according to an example.
Figure 10:
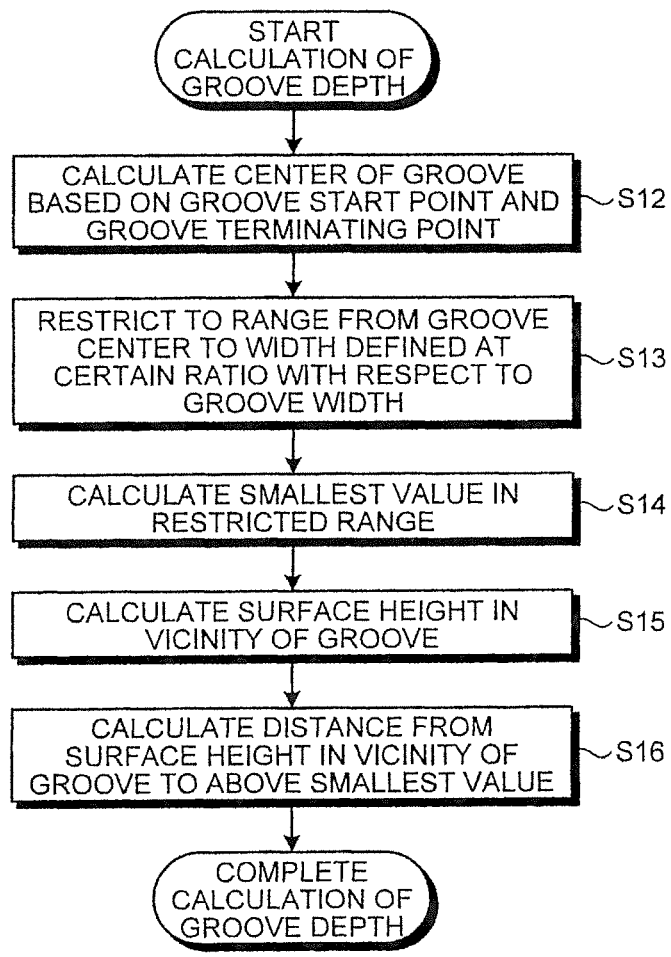
FIG. 10 is a flowchart illustrating a method of calculating the groove depth in the surface shape measuring method according to an example.
Figure 11A:
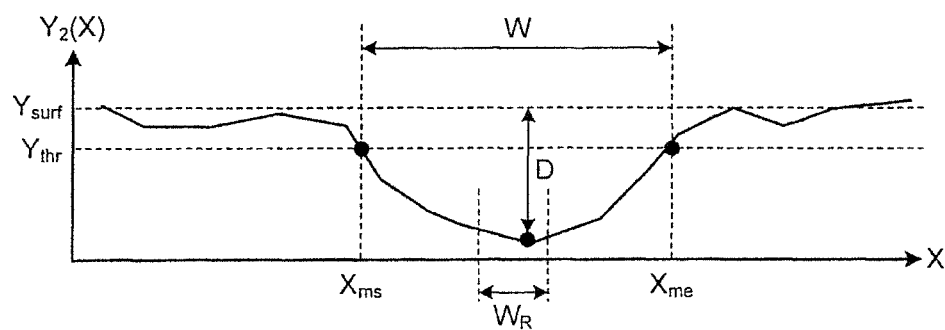
FIG. 11A is a conceptual diagram illustrating the way in which the groove depth is calculated in the surface shape measuring method according to an example.
Figure 11B:
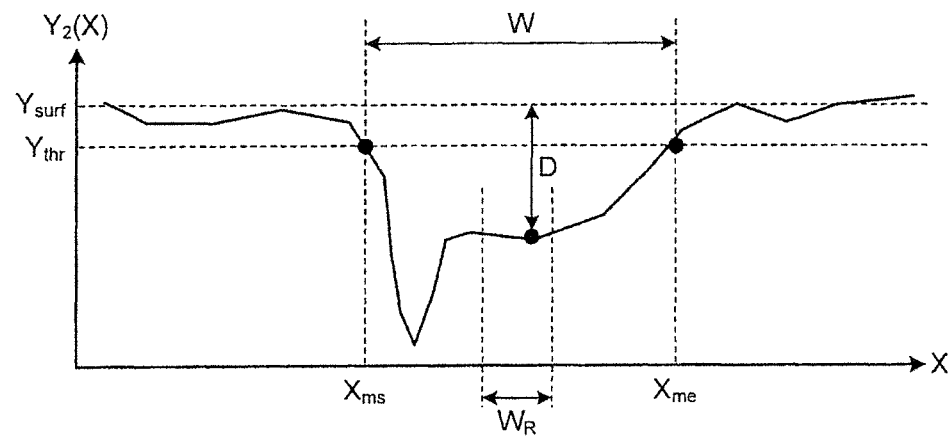
FIG. 11B is another conceptual diagram illustrating the way in which the groove depth is calculated in the surface shape measuring method according to an example.

FIG. 6 is a flowchart illustrating a method of detecting the groove approximate range in the surface shape measuring method. FIGS. 7A to 7C are conceptual diagrams illustrating the way in which the groove approximate range is detected in the surface shape measuring method. FIG. 8 is a flowchart illustrating a method of calculating the groove width in the surface shape measuring method. FIG. 9 is a conceptual diagram illustrating the way in which the groove width is calculated in the surface shape measuring method. FIG. 10 is a flowchart illustrating a method of calculating the groove depth in the surface shape measuring method. FIGS. 11A and 11B are conceptual diagrams illustrating the way in which the groove depth is calculated in the surface shape measuring method.

The groove approximate range detecting step (Step STP2) will now be described. As FIG. 6 illustrates, with the method of detecting the groove approximate range in the surface shape measuring method, the groove approximate range detecting unit 43 detects a descending point (Step S1) and detects a rising point (Step S2). At Step S1 and Step S2, the descending point and the rising point of the shape indicating the groove approximate range are defined as follows based on the amount of a local change on the displacement data $Y_1$ (X).

As FIG. 7A illustrates, when the groove approximate range detecting unit 43 searches for a descending point from a side (for example, in the conveyance direction of the steel sheet S) of the displacement data $Y_1$ (X) (the zone $S_D$ in the drawing), the descending point $X_d$ (the position $P_6$ in the drawing) is defined as a position where the difference between the displacement data $Y_1$ at a current detecting position (X) and the displacement data $Y_1$ at a position moved forward from the current detecting position by a predetermined distance, $D_{diff}$ ($D_{diff}$>0), is equal to or smaller than a predetermined value, $-Y_{diff}$ ($Y_{diff}$>0).

In the expression for representing the descending point $X_d$, a position X, which first satisfies Expression (1) is defined as the descending point $X_d$. In this case, the left part of Expression (1) represents the amount of a local change of displacement.

$$Y_1(X+D_{diff})-Y_1(X) \leq -Y_{diff} \qquad (1)$$

After that, as FIG. 7A illustrates, the groove approximate range detecting unit 43 starts searching for a rising point from the position where the descending point has been detected (the zone $S_u$ in the drawing). The groove approximate range detecting unit 43 searches for the rising point while comparing two points separated from each other by a predetermined distance $D_{diff}$, passes the position X (the position $P_7$ in the drawing), which satisfies Expression (2), and detects the position X (the position $P_7$ in the drawing), which satisfies Expression (3), and defines the position $X_u$, which is: X+$D_{diff}$ as a rising point (the position $P_9$ in the drawing).

$$Y_1(X+D_{diff})-Y_1(X) \geq Y_{diff} \qquad (2)$$

$$Y_1(X+D_{diff})-Y_1(X) < Y_{diff} \qquad (3)$$

With the method of detecting the groove approximate range in the surface shape measuring method, the groove approximate range detecting unit 43 determines, with determination conditions in two stages, whether the descending point $X_d$ and the rising point $X_u$ detected as above indicate respective ends of a single groove.

As a first determination, the groove approximate range detecting unit 43 determines whether the descending point $X_d$ and the rising point $X_u$ are situated within a predetermined distance (Step S3). In other words, with the predetermined distance as $D_w$, the groove approximate range detecting unit 43 determines whether the Expression (4) is satisfied.

$$X_u-X_d \leq D_w \qquad (4)$$

If Expression (4) is not satisfied (No at Step S3), the groove approximate range detecting unit 43 turns back the detecting position from the rising point $X_u$ by the predetermined distance $D_w$ (which makes the detecting position as: $X_u-D_w$) and restarts detection of the descending point from Step S1 (Step S4).

FIG. 7B illustrates an example where the detecting position of a descending point is amended in the first determination. As FIG. 7B illustrates, a convex shape is sometimes observed on the displacement data $Y_1$ (X). The convex shape may result from minute dust or any concavo-convex pattern other than the groove present on the surface of the steel sheet S, a noise mixed into a displacement signal of the laser displacement meter, or the like. If such a convex shape exists on the displacement data $Y_1$ (X), a descending point is unexpectedly detected at the convex shape as indicated with the position $P_{10}$ in the drawing (the zone $S_D$ in the drawing). This causes the groove approximate range detecting unit 43 detecting a rising point (the zone $S_u$ in the drawing) to detect the position $P_{11}$ in the drawing as a rising point corresponding to the position $P_{10}$ in the drawing.

To eliminate an incorrect determination that occurs when the displacement data $Y_1$ (X) has any convex shape as FIG. 7B illustrates, such processing is performed in the first determination that determines whether the distance between the detected descending point $X_d$ and the rising point $X_u$ is smaller than a predetermined value $D_w$. This predetermined value $D_w$ is a set value set based on the width of the groove formed on the steel sheet S.

For example, in the displacement data $Y_1$ (X) indicated in FIG. 7B, the distance between the descending point $X_d$ (the position $P_{10}$ in the drawing) and the rising point $X_u$ (the position $P_{11}$ in the drawing) is greater than the predetermined value $D_w$. The position $P_{10}$ in the drawing is accordingly determined as a position that has been incorrectly detected. The groove approximate range detecting unit 43 turns back the searching position from the rising point $X_u$ (the position $P_{11}$ in the drawing) by the predetermined value $D_w$ and restarts detection of the descending point from the position $P_{12}$ in the drawing (the zone $S'_D$). With this, the position $P_{13}$ in the drawing to be paired with the rising point $X_u$ (the position $P_{11}$ in the drawing) is detected as a proper descending point (the zone $S'_U$ in the drawing).

If Expression (4) is satisfied (Yes at Step S3), as the second determination, the groove approximate range detecting unit 43 determines whether the difference between the displacement amount at the descending point $X_d$ and the displacement amount at the rising point $X_u$ is within a predetermined value (Step S5). In other words, the groove approximate range detecting unit 43 determines, with an allowable difference in the displacement amount as $Y_a$, whether the Expression (5) is satisfied.

$$|Y_1(X_u)-Y_1(X_d)| < Y_a \qquad (5)$$

If Expression (5) is not satisfied (No at Step S5), the groove approximate range detecting unit 43 turns back to Step S2 and restarts detection of the rising point from the next position to the position X (which is: $X_U-D_{diff}$) where the rising point has been detected.

FIG. 7C illustrates an example where the detection position for the rising point is amended based on the second determination. In FIG. 7C, an abnormal shape, which is deeper than the bottom of the groove, is observed on the displacement data $Y_1$ (X) due to the secondary reflection phenomenon of the laser light 25 that occurs at a slant portion of the groove as illustrated in FIG. 2. With such displacement data $Y_1$ (X), the descending point is detected at the position $P_{14}$ (the zone $S_D$ in the drawing), and due to the abnormal shape, an incorrect rising point is thereafter detected at a position right after the abnormal shape portion, at the position $P_{15}$ in the drawing (the zone $S_U$ in the drawing).

The groove approximate range detecting unit 43 compares the difference in values between the displacement data $Y_1$ (X) at the descending point and the displacement data $Y_1$ (X) at the rising point with the allowable value $Y_a$ and determines whether the rising point has been incorrectly detected. In the example of FIG. 7C, the difference in values between the displacement data $Y_1$ (X) at the descending point and the displacement data $Y_1$ (X) at the rising point corresponds to $D_1$ in the drawing, and it is thus determined that the position $P_{15}$ in the drawing, which has been detected as a rising point, is an incorrect position. The groove approximate range detecting unit 43 restarts detection of the rising point from the position $P_{16}$ ($X_u-D_{diff}$) in the drawing and detects the position $P_{17}$ in the drawing as a rising point corresponding to the position $P_{14}$ in the drawing as a descending point (the zone S'$_U$ in the drawing).

If Expression (5) is satisfied (Yes at Step S5), the groove approximate range detecting unit 43 outputs the descending point $X_d$ and the rising point $X_u$ to the groove approximate range extracting unit 44 as an approximate range of the groove (Step S6).

As described above, in the groove approximate range detecting step (Step STP2), the determination conditions in two stages assure that a descending point and a rising point correctly indicate the approximate existing range of a single groove.

The groove width calculating step (Step STP3) will now be described. As FIG. 8 illustrates, with the groove width calculating method in the surface shape measuring method, the groove width calculating unit 46 calculates the surface height $Y_{surf}$ in the vicinity of the groove (Step S7). The vicinity of the groove denotes the range from the approximate start point $X_s$ to the descending point $X_d$ and the range from the rising point $X_u$ to the approximate terminating point $X_e$. The groove width calculating unit 46 calculates the surface height $Y_{surf}$ of the steel sheet S by calculating the average value of these ranges on the post-second-filtering displacement data $Y_2$ (X).

The groove width calculating unit 46 thereafter calculates an edge-detecting threshold $Y_{thr}$ that detects an edge of the groove based on the surface height $Y_{surf}$ of the steel sheet S (Step S8). In other words, the groove width calculating unit 46 calculates an edge-detecting threshold $Y_{thr}$ that determines positions where the depth from the surface height $Y_{surf}$ reaches a predetermined value as a groove start point and a groove termination point. The edge-detecting threshold $Y_{thr}$ is a value smaller than the surface height $Y_{surf}$ by a predetermined value $L_{thr}$ ($\geq 0$) and is calculated as: $Y_{thr}=Y_{surf}-L_{thr}$.

The groove width calculating unit 46 searches for the deepest position (the smallest value) between the descending point $X_d$ and the rising point $X_u$ on $Y_2$ (X) (Step S9) and thereafter searches for the groove start point $X_{ms}$ and the groove terminating point $X_{me}$ at respective sides of the deepest position (Step S10). Specifically, the groove width calculating unit 46 searches in the direction of the descending point from the deepest position and detects a position first exceeding the threshold $Y_{thr}$ as the groove start point $X_{ms}$ (see FIG. 9). Similarly, the groove width calculating unit 46 searches in the direction of the rising point from the deepest position and detects a position first exceeding the threshold $Y_{thr}$ as the groove terminating point $X_{me}$ (see FIG. 9).

The groove width calculating unit 46 thereafter calculates the distance between the groove start point $X_{ms}$ and the groove terminating point $X_{me}$ as the groove width W (Step S11). In other words, the groove width calculating unit 46 carries out an operation of: $W=X_{me}-X_{ms}$.

The groove depth calculating step (Step STP4) is now described. As FIG. 10 illustrates, with the groove depth calculating method in the surface shape measuring method, the groove depth calculating unit 47 calculates a groove center portion $W_R$ based on the groove start point $X_{ms}$ and the groove terminating point $X_{me}$ (Step S12). Specifically, the groove depth calculating unit 47 calculates the center position between the groove start point $X_{ms}$ and the groove terminating point $X_{me}$ and calculates the range from the center position to the width defined at a predetermined ratio R with respect to the groove width W (that is: W×R) as the groove center portion $W_R$.

The groove depth calculating unit 47 restricts the post-second-filtering displacement data $Y_2$ (X) to the range of the groove center portion $W_R$ (Step S13). The groove depth calculating unit 47 thereafter calculates the smallest value of the post-second-filtering displacement data $Y_2$ (X) in the restricted range (Step S14).

The groove depth calculating unit 47 further calculates the surface height $Y_{surf}$ in the vicinity of the groove (Step S15). However, the groove width calculating unit 46 has already calculated the surface height $Y_{surf}$ in the vicinity of the groove, and the groove depth calculating unit 47 can use this surface height $Y_{surf}$ in the vicinity of the groove.

As a final process, the groove depth calculating unit 47 calculates the groove depth D by calculating the distance from the surface height $Y_{surf}$ in the vicinity of the groove to the smallest value of the post-second-filtering displacement data $Y_2$ (X) in the restricted area calculated at Step S14 (Step S16).

In this way, the groove depth calculating unit 47 calculates the groove depth D. With this, even if an abnormal value is caused at a slant portion of the groove as illustrated in FIG. 11B despite no abnormality on the displacement data as illustrated in FIG. 11A, the groove depth is accurately measured without being affected by the abnormal value. The ratio defining the width of the searching zone for the groove width W can be set at a value with which no abnormal value is caused at a slant portion of the groove. For example, it is preferable to set the ratio at around 30 percent to 10 percent for the groove width W.

When grooves are formed on electrical steel sheet, the grooves are successively formed on the sheet at a constant interval. Displacement data thus usually include a plurality of groove cross-sectional shapes. When applying the surface shape measuring method for such a case, the plurality of groove shapes included in the displacement data can be subsequently measured by repeating a series of steps that detects and measures a groove shape portion based on the rising point $X_u$, the groove terminating point $X_{ms}$, or the like detected at a preceding step.

The surface shape measuring method includes a displacement data acquiring step of acquiring displacement data on the surface of the steel sheet S facing the displacement meter head 2 by scanning the surface of the steel sheet S with the displacement meter head 2 that applies a light beam on the steel sheet S and performs triangulation, a groove approximate range detecting step of detecting an approximate range arranged on the surface of the steel sheet S including a groove formed on the surface of the steel sheet S by searching the displacement data, a groove width calculating step of calculating a groove start point and a groove terminating point of the groove included in the approximate range, a deepest position detecting step of calculating the smallest value of the displacement data in the restricted range from the center position between the groove start point and the groove terminating point to the width defined at a predetermined ratio with respect to the groove width, and a groove depth calculating step of calculating the difference between the smallest value of the displacement data calculated at the deepest position detecting step and the surface height of the object as the depth of the groove formed on the surface of the object. This makes it possible to eliminate disturbance included in the displacement data and measure the accurate size of the groove formed on the surface of the steel sheet S using only the displacement data on the surface of the object measured by using the displacement meter head 2.

INDUSTRIAL APPLICABILITY

As described above, the surface shape measuring method and the surface shape measuring device exert advantageous effects in measuring the size of a groove formed on a surface of an object.

The invention claimed is:
1. A surface shape measuring method comprising:
a displacement data acquiring step of acquiring displacement data on an object surface facing an optical displacement meter by scanning the object surface with an optical displacement meter that applies a light beam on the object surface and performs measurement;
a groove approximate range detecting step of detecting an approximate range on the object surface including a groove formed on the object surface by searching the displacement data;
a groove width calculating step of calculating a groove start point and a groove terminating point of the groove included in the approximate range;
a deepest position detecting step of calculating a smallest value of the displacement data in a restricted range from a center position between the groove start point and the groove terminating point to a width defined at a predetermined ratio with respect to the groove width, the width defined at the predetermined ratio being narrower than the groove width; and
a groove depth calculating step of calculating a difference between the smallest value of the displacement data calculated at the deepest position detecting step and the height of the object surface as the depth of the groove formed on the object surface.
2. The method according to claim 1, wherein the groove width calculating step includes:

a surface height calculating step of calculating the height of the object surface based on the displacement data in an outer vicinity of the approximate range;
a threshold setting step of setting an end-detecting threshold for the groove formed on the object surface based on the height of the object surface;
an end detecting step of searching a front side and a back side in a direction of the scanning from a position where the displacement data in the approximate range indicates a smallest value and detecting positions where a value of the displacement data first exceeds the end-detecting threshold as the groove start point and the groove terminating point of the groove; and
a difference calculating step of calculating the distance between the groove start point and the groove terminating point of the groove as the width of the groove formed on the object surface.
3. The method according to claim 2, wherein the groove approximate range detecting step includes:
a start point detecting step of searching in the scanning direction of the displacement data and detecting a position where an amount of a local change on the displacement data starts falling below a predetermined value as a start point of the approximate range;
a terminating point detecting step of searching continuously from the start point of the approximate range and detecting a position where the amount of a local change on the displacement data stops exceeding a predetermined value as a terminating point of the approximate range;
a first determination step of determining whether the distance between the start point of the approximate range and the terminating point of the approximate range is within a predetermined distance;
a second determination step of determining whether the difference in values between the displacement data at the start point of the approximate range and the displacement data at the terminating point of the approximate range is within a predetermined range; and
a judging step of determining the start point of the approximate range and the terminating point of the approximate range to be true only when determinations at the first determination step and the second determination step are positive.
4. The method according to claim 1, wherein the groove approximate range detecting step includes:
a start point detecting step of searching in the scanning direction of the displacement data and detecting a position where an amount of a local change on the displacement data starts falling below a predetermined value as a start point of the approximate range;
a terminating point detecting step of searching continuously from the start point of the approximate range and detecting a position where the amount of a local change on the displacement data stops exceeding a predetermined value as a terminating point of the approximate range;
a first determination step of determining whether the distance between the start point of the approximate range and the terminating point of the approximate range is within a predetermined distance;
a second determination step of determining whether the difference in values between the displacement data at the start point of the approximate range and the displacement data at the terminating point of the approximate range is within a predetermined range; and a judging step of determining the start point of the approximate range and the terminating point of the approximate range to be true only when determinations at the first determination step and the second determination step are positive.

5. The method according to claim 1, wherein the groove approximate range detecting step detects the approximate range on the object surface that includes the groove formed on the object surface after a first filtering is performed on the displacement data.

6. The method according to claim 5, wherein the first filtering is carried out with a linear filter, a median filter, or a combination of the linear filter and the median filter.

7. The method according to claim 1, wherein the groove width calculating step and the groove depth calculating step calculate the groove start point and the groove terminating point of the groove and the groove depth after a second filtering is performed on the displacement data.

8. The method according to claim 7, wherein the second filtering is carried out with a linear filter, a median filter, or a combination of the linear filter and the median filter.

9. A surface shape measuring device comprising:
a displacement data acquiring unit that acquires displacement data on an object surface facing an optical displacement meter by scanning the object surface with an optical displacement meter that applies a light beam on the object surface and performs measurement;
a groove approximate range detecting unit that detects an approximate range on the object surface including a groove formed on the object surface by searching the displacement data;
a groove width calculating unit that calculates a groove start point and a groove terminating point of the groove included in the approximate range;
a deepest position detecting unit that calculates a smallest value of the displacement data in a restricted range from a center position between the groove start point and the groove terminating point to a width defined at a predetermined ratio with respect to the groove width, the width defined at the predetermined ratio being narrower than the groove width; and
a groove depth calculating unit that calculates a difference between the smallest value of the displacement data calculated by the deepest position detecting unit and the height of the object surface as the depth of the groove formed on the object surface.

10. The device according to claim 9, wherein the groove width calculating unit includes:
a surface height calculating unit that calculates the height of the object surface based on the displacement data in an outer vicinity of the approximate range;
a threshold setting unit that sets an end-detecting threshold for the groove formed on the object surface based on the height of the object surface;
an end detecting unit that searches a front side and a back side in a direction of the scanning from a position where the displacement data in the approximate range indicates a smallest value and detects positions where a value of the displacement data first exceeds the end-detecting threshold as the groove start point and the groove terminating point of the groove; and a difference calculating unit that calculates the distance between the groove start point and the groove terminating point of the groove as the width of the groove formed on the object surface.

11. The device according to claim 10, wherein the groove approximate range detecting unit includes:
a start point detecting unit that searches in the scanning direction of the displacement data and detects a position where an amount of a local change on the displacement data starts falling below a predetermined value as a start point of the approximate range;
a terminating point detecting unit that searches continuously from the start point of the approximate range and detects a position where the amount of a local change on the displacement data stops exceeding a predetermined value as a terminating point of the approximate range;
a first determination unit that determines whether the distance between the start point of the approximate range and the terminating point of the approximate range is within a predetermined distance;
a second determination unit that determines whether the difference in values between the displacement data at the start point of the approximate range and the displacement data at the terminating point of the approximate range is within a predetermined range; and
a judging unit that determines the start point of the approximate range and the terminating point of the approximate range to be true only when determinations by the first determination unit and the second determination unit are positive.

12. The device according to claim 9, wherein the groove approximate range detecting unit includes:
a start point detecting unit that searches in the scanning direction of the displacement data and detects a position where an amount of a local change on the displacement data starts falling below a predetermined value as a start point of the approximate range;
a terminating point detecting unit that searches continuously from the start point of the approximate range and detects a position where the amount of a local change on the displacement data stops exceeding a predetermined value as a terminating point of the approximate range;
a first determination unit that determines whether the distance between the start point of the approximate range and the terminating point of the approximate range is within a predetermined distance;
a second determination unit that determines whether the difference in values between the displacement data at the start point of the approximate range and the displacement data at the terminating point of the approximate range is within a predetermined range; and
a judging unit that determines the start point of the approximate range and the terminating point of the approximate range to be true only when determinations by the first determination unit and the second determination unit are positive.

* * * * *